April 23, 1957 — O. W. HOSKING — 2,789,577
LIFE RAFT VALVE
Filed July 17, 1953
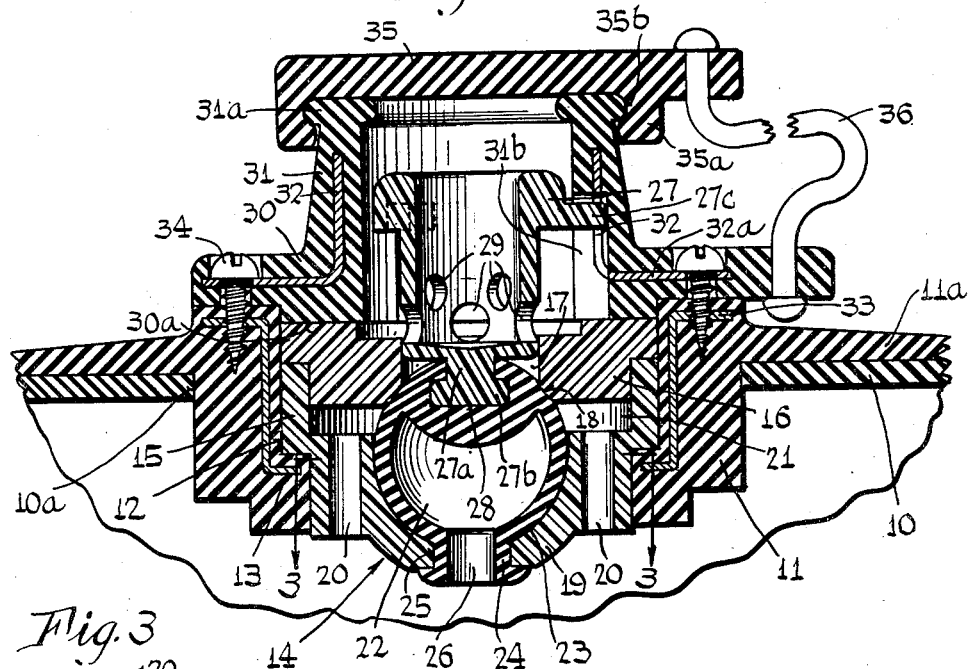
Fig. 1
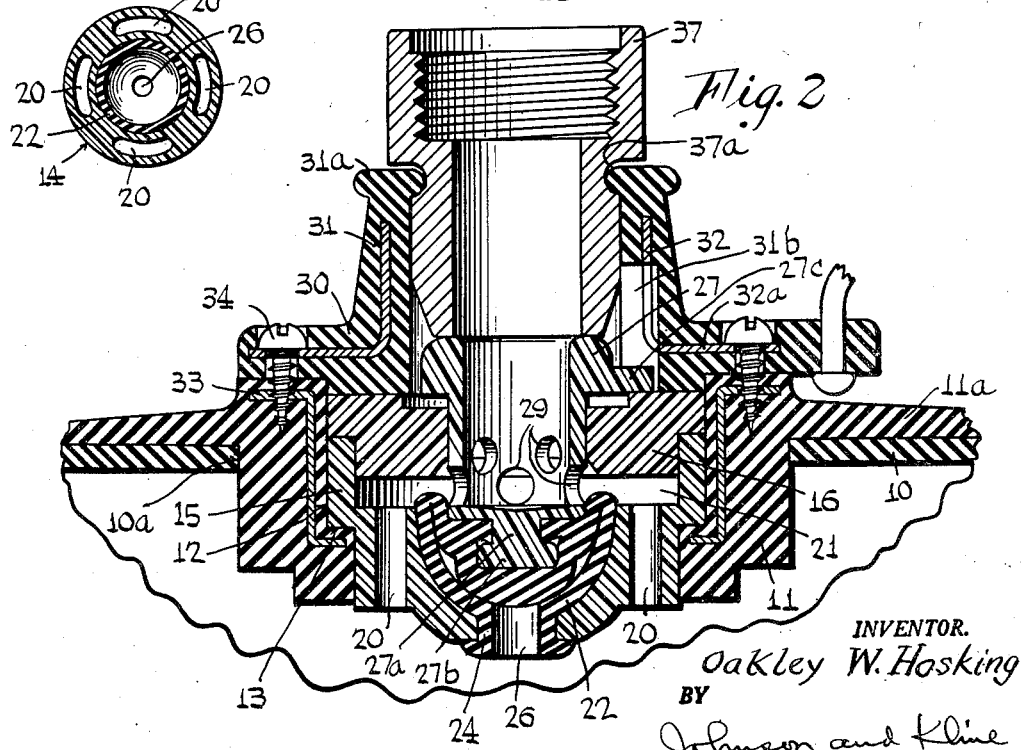
Fig. 3
Fig. 2
INVENTOR.
Oakley W. Hosking
BY
Johnson and Kline
ATTORNEYS ed within the bore 12 is a valve unit comprising a rigid valve carrier 14 extending thereacross and having an enlarged portion 15 projecting radially to engage the shoulder 13 and extending upwardly to receive with a snug fit and support in spaced relation thereto, a rigid valve block 16 having a central aperture 17 and a valve seat 18 surrounding the aperture on the inner surface of the block. The carrier has a central valve-receiving portion 19 and passages 20 located around the portion 19 as shown in Fig. 3, and extending from the interior of the raft to the space 21 between the valve block and the carrier.

2,789,577

LIFE RAFT VALVE

Oakley W. Hosking, Monroe, N. Y.

Application July 17, 1953, Serial No. 368,780

5 Claims. (Cl. 137—223)

This invention relates to valves of the type used for inflating an inflatable body or device such as a life raft and the like.

It is an object of the invention to provide a valve which is easy to manufacture and assemble, which is capable of simplified operation and which securely holds the air pressure within the inflatable body or raft.

This accomplished by providing a collapsible valve member which is normally distended into valve-engaging position and which may have its walls collapsed to move the valve-engaging portion toward the opposite wall thereof.

In the present preferred form of the invention the valve member is in the form of a ball valve of rubber and it is adapted to be collapsed so that the valve-engaging wall portion is moved into nested relation with the opposed wall thereof thus providing for a relatively long stroke of the actuator and insuring proper operation of the valve.

A feature of the present invention resides in the fact that it is made of readily moldable parts which can be easily and quickly assembled without the necessity of special tools.

Another feature of the invention resides in the provision of a novel neck structure which serves to protect the valve actuator and to maintain a closure over the valve actuator in position and also hold an inflating tool in position when the cover is removed to facilitate inflating and deflating the raft.

This application relates to a species of the invention described and claimed in my copending application, Serial Number 368,675, filed July 17, 1953.

Other features and advantages of the invention will be apparent from the specification and claims when considered in connection with the drawings in which:

Figure 1 shows a longitudinal sectional view of the valve in sealing position.

Fig. 2 shows a view similar to Fig. 1 in inflating position.

Fig. 3 is a sectional view taken along line 3—3 of Fig. 1.

While the valve of the present invention may be utilized for any inflatable device, it is herein illustrated as applied to an inflatable life raft having walls 10 of rubber or the like material with an aperture 10a therein to receive the valve. The valve comprises a mounting member 11 of stiff rubber adapted to fit into the opening 10a and provided with flanges 11a adapted to overlie the walls 10 around the opening 10a and be secured thereto by vulcanization or other suitable adhesives. The term "rubber" is used herein to designate natural or synthetic rubber or rubber-like materials, and suitable plastics capable of substituting for rubber. The valve mounting means is provided with a bore 12 extending therethrough and having adjacent the inner end a shoulder 13. Mount- In accordance with the present invention a collapsible hollow valve member is carried in the valve-receiving portion of the valve carrier and is resiliently distended to engage the valve seat and close the valve. While this hollow valve member may take many forms, it is herein illustrated as a hollow ball valve 22, preferably spherical, which is supported in the space between the valve block and carrier in an upwardly facing hemispherical recess 23 in the portion 19 of the valve carrier and is located opposite the valve seat 18. The ball valve is of resilient material such as rubber which normally distends the ball so that the wall opposite that supported by the carrier engages the valve seat 18 to close the valve.

In the illustrated form of the invention the ball valve is anchored to the carrier by means of a flanged neck 24 passing through a central aperture 25 in the carrier. Preferably the neck is provided with a passage 26 communicating with the interior of the raft which forms a vent for the ball valve during collapsing thereof and enables pressure in the raft to be transmitted to the interior of the ball valve and also distend the walls thereof into sealing relation with the valve seat.

As shown in Figs. 1 and 2 a valve actuator 27 is slidably mounted in the aperture 17 in the valve block to engage and move the valve seat-engaging portion of the ball valve out of engagement with the valve seat. It is at present preferred to connect the actuator to the valve. This is accomplished by providing its inner end with a projection 27a having an enlarged head 27b adapted to be received in a socket 28 in the wall of the ball valve to be interlocked therewith in all flexed positions thereof. It will be noted that the valve-engaging wall of the ball valve having the socket therein is substantially thicker and less flexible than the remaining walls thereof so that pressure on the valve actuator will move the valve seat-engaging wall as a unit away from the valve seat and will flex the side walls. The ball valve when so actuated, as shown in Fig. 2, collapses and enables the valve-engaging portion to nest with the supported wall portion, thus permitting substantial movement of the actuator and giving an indication of the position of the valve seat-engaging portion of the ball valve.

In the herein illustrated form of the invention the valve actuator, which also forms the means for inflating the raft, is tubular and is provided adjacent the ball valve with apertures 29 so that when the actuator is moved inwardly to the position shown in Fig. 2 the apertures will be in communication with the space 21 between the valve seat and the valve carrier and the passages 20 to the raft so that the same may be inflated.

The valve carrier, valve block and actuator are made of any suitable rigid material. In the herein illustrated form of the invention they are molded from a rigid plastic compound. It will be seen that the elements of the valve unit can be readily assembled into an easily handled unit which can be quickly inserted into the bore 12 of the mounting means 11.

After the valve unit is in place in the bore 12 it is secured and sealed therein by a rubber cover 30 adapted to overlie the unit. The cover is provided with a projecting neck portion 31 surrounding the valve actuator so as to protect the same and prevent inadvertent operation thereof. In the preferred form of the invention the cover has a flanged reinforcing member 32 embedded in the neck to extend beyond the position of the neck actuator with the flange 32a extending over an anchoring member 33 embedded in the mounting device. While the cover may be secured in any suitable manner, it is at present preferred to use fastening means 34, such as self tapping screws, which pass through the flange 32a and into the anchoring member 33 to clamp the cover into tight sealing relation with the mounting device, with the portion 30a of the cover engaging the valve unit and holding it firmly against the shoulder 13.

In order to further protect the valve actuator the neck portion can be provided with a closure cap 35. In the illustrated form of the invention the cap is held in position by providing the outer end of the neck 31 with a bead 31a and by providing the cap with a depending portion 35a having a groove 35b therein into which the bead is adapted to be snapped when the cap is applied to removably lock the cap in position. If desired, the cap can be connected to the cover by a flexible cord 36 so as to become a captive closure and prevent its loss.

When it is desired to inflate the raft, the cap is removed and a tubular inflating or deflating tool 37 adapted to be connected to any suitable inflating device (not shown) is inserted into the neck and into engagement with the valve actuator forcing the actuator to the position shown in Fig. 2. In accordance with the present invention the inflating tool can be readily held in this position so as to free the hands of the operator for other operations. This is accomplished by providing a groove 37a on the tool and into which the bead can snap and hold the inflating tool and the valve in open position.

From the foregoing it will be seen that I have provided a valve device in which the valve actuator has a long stroke to insure proper operation, which device can be easily and readily manufactured and assembled, is capable of simplified operation, and which securely holds the air pressure within the raft, the holding force of the ball valve member being augmented by the pressure within the raft so that the greater the pressure in the raft the greater the holding power in the valve.

Another advantage of the present invention resides in the fact that should the valve become damaged the valve unit may be readily removed and replaced without the necessity of special equipment.

Where the valve of the present invention is to be used with inflatable devices having considerable fluid pressure, the neck portion 31 of the cover and the reinforcing insert 32 thereof are provided with a plurality of notches 31b extending longitudinally in the bore of the cover, and the valve actuator 27 is provided with a plurality of radially-extending lugs 27c projecting into the notches 31b. The lugs 27c travel in the notches when the valve actuator 27 is depressed, as shown in Fig. 2. If there is any tendency for the ball valve 22 to be forced upward through the valve seat 18 because of elevated pressures in the raft, the lugs 27c will engage the uppermost ends of the notches 31b, limiting upward movement of the actuator 27, and the latter will thereby support the seat-engaging portion of the ball 22 and prevent the ball from being forced upwardly through the valve seat.

Variations and modifications may be made within the scope of the claims and portions of the improvements may be used without others.

I claim:

1. In an inflating valve for an inflatable device, a valve mounting member, a rigid valve block having a valve seat and an inlet passage mounted in said member, a rigid valve carrier having an outlet passage mounted in said member in spaced relation to said valve block and having an aperture opposite said valve seat, a hollow spherical rubber ball valve mounted on the carrier in the space between the valve block and carrier, having a portion engaging the valve seat and having an opposite portion supported by said carrier and provided with a neck extending through and interlocked with the aperture on the carrier, the rubber of said ball valve being resilient and urging the valve seat-engaging portion to a distended position wherein the portion engages the valve seat to close the valve, said ball valve having a passage extending through said neck whereby fluid pressure in the inflatable device acts to also move the valve seat-engaging portion of the ball valve into engagement with the valve seat to close the valve, and means engaging the valve seat-engaging portion of the ball valve to flex the seat-engaging portion of the ball valve and move the seat-engaging portion out of engagement with the valve seat and into nested relation with said portion supported by the carrier thereby to open the valve.

2. In an inflating valve for use with an inflatable device, a valve mounting member, a rigid valve block having a valve seat and an inlet passage mounted in said member, a rigid valve carrier having an outlet passage mounted in said member in spaced relation to said valve block and having an aperture opposite said valve seat, a hollow collapsible ball valve mounted on the carrier in the space between the valve block and carrier and having a neck extending through and interlocked with the aperture on the carrier, said ball valve being resiliently urged to distended position wherein a portion of the ball valve engages the valve seat and having a passage extending through said neck whereby fluid pressure in the inflatable device acts to also move the valve seat-engaging portion of the ball valve into engagement with the valve seat to close the valve, and means engaging the valve seat-engaging portion of the ball valve to move the same toward the remote portion of the ball valve and out of engagement with the valve seat to permit communication between the inlet passage and the outlet passage.

3. In an inflating valve for use with an inflatable device, a valve mounting member adapted to be secured to said device and having a bore therethrough provided with a shoulder adjacent the inner end thereof; a valve unit disposed in the bore of the mounting member; a closure member fastened to the outer end of the mounting member and securing the valve unit in the bore in engagement with the shoulder, said unit including a valve seat and a spaced valve carrier and a hollow collapsible ball valve of resilient material carried by the carrier and disposed in the space between the valve seat and carrier and urged to distended position wherein a portion of the ball valve engages the valve seat to close the valve and having an aperture adapted to open into the interior of the device whereby fluid pressure therein also urges the valve seat-engaging portion of the ball valve against the valve seat, said carrier engaging and supporting a portion of the ball valve remote from the valve seat and having outlet passages therearound adapted to connect the space adjacent the valve seat to the interior of the device, and a tubular actuator slidably mounted on the unit and secured to the valve seat-engaging wall of the ball valve for collapsing the ball to move the valve seat-engaging portion toward the carrier engaging portion and out of engagement with the valve seat, said tubular actuator having inlet apertures therein which are exposed when the ball valve is collapsed and communicate with the space adjacent the valve seat and the outlet apertures whereby the valve is adapted to permit inflation of the device therethrough.

4. In an inflating valve for use with an inflatable life raft, a valve mounting member of rubber adapted to be mounted on the raft, a rigid valve block having a valve seat mounted in said member, a rigid valve carrier mounted in said member, having outlet apertures, a rubber closure member fastened to the mounting member and securing the valve block and valve carrier therein, a hollow collapsible ball valve of resilient material carried by the carrier and urged to distended position wherein a portion of the ball valve engages the valve seat to close the valve, said carrier engaging and supporting a portion of the ball remote from the valve seat, and a tubular actuator member passing through the valve block and secured to the valve seat-engaging portion of the ball valve for collapsing the same to move the valve seat-engaging portion toward the carrier-engaging portion and out of engagement with the valve seat, said tubular member having inlet apertures therein which are exposed when the ball valve is collapsed and which are adapted to communicate through the outlet apertures with the interior of the raft to permit inflation thereof when the ball valve is collapsed.

5. In an inflating valve for use with an inflatable life raft, a valve mounting member of rubber having a bore therethrough provided with a shoulder adjacent the inner end thereof adapted to be mounted on the raft, a rigid valve block having a valve seat and a spaced rigid valve carrier having outlet apertures disposed in the bore of the mounting member, a rubber closure member fastened to the outer end of the mounting member and securing the valve block and valve carrier in the bore, a hollow collapsible ball valve of resilient material carried by the carrier and disposed in the space between the valve block and carrier and urged to distended position by the resiliency of the material of the ball valve wherein a portion thereof engages the valve seat to close the valve and having an aperture adapted to open into the interior of the raft whereby fluid pressure therein also urges the valve seat-engaging portion of the ball against the valve seat, said carrier engaging and supporting a portion of the ball remote from the valve seat and having passages therearound adapted to connect the space adjacent the valve seat to the interior of the raft, and a tubular actuator member passing through the valve block and secured to the valve seat-engaging portion of the ball valve for collapsing the ball to move the valve seat-engaging portion into nested relation with the carrier-engaging portion and out of engagement with the valve seat, said tubular member having apertures therein which are exposed when the member is moved inwardly to collapse the ball valve and communicate with the space adjacent the valve seat and with the outlet passages whereby the valve is adapted to permit inflation of the raft therethrough.

References Cited in the file of this patent

UNITED STATES PATENTS

| | | |
|---|---|---|
| 244,468 | McElroy | July 19, 1881 |
| 505,486 | Schrader | Sept. 26, 1893 |
| 637,919 | Brown | Nov. 28, 1899 |
| 670,725 | Pickett | Mar. 26, 1901 |
| 1,758,625 | Saul | May 13, 1930 |
| 1,896,708 | Jones | Feb. 7, 1933 |
| 2,229,379 | Keefe | Jan. 21, 1941 |
| 2,475,851 | Moore | July 12, 1949 |
| 2,677,388 | Neff | May 4, 1954 |
| 2,679,857 | Russell | June 1, 1954 |

FOREIGN PATENTS

| | | |
|---|---|---|
| 420,346 | Great Britain | Nov. 29, 1934 |